US012625939B2

(12) United States Patent
Kalish

(10) Patent No.: US 12,625,939 B2
(45) Date of Patent: May 12, 2026

(54) SYSTEM AND METHOD FOR GENERATING VIDEO VISUAL PROOF

(71) Applicant: Idomoo LTD, Raanana (IL)

(72) Inventor: Danny Kalish, Raanana (IL)

(73) Assignee: Idomoo LTD, Raanana (IL)

( * ) Notice: Subject to any disclaimer, the term of this patent is extended or adjusted under 35 U.S.C. 154(b) by 103 days.

(21) Appl. No.: 18/324,730

(22) Filed: May 26, 2023

(65) Prior Publication Data

US 2023/0385397 A1 Nov. 30, 2023

Related U.S. Application Data

(60) Provisional application No. 63/346,077, filed on May 26, 2022.

(51) Int. Cl.
| | |
|---|---|
| *G06F 21/36* | (2013.01) |
| *G06T 13/80* | (2011.01) |
| G06K 19/06 | (2006.01) |

(52) U.S. Cl.
CPC .............. *G06F 21/36* (2013.01); *G06T 13/80* (2013.01); *G06K 19/06037* (2013.01)

(58) Field of Classification Search
CPC .... G06F 21/36; G06T 13/80; G06K 19/06037
USPC ........................................................ 726/18
See application file for complete search history.

(56) References Cited

U.S. PATENT DOCUMENTS

| | | | |
|---|---|---|---|
| 2015/0317700 A1* | 11/2015 | Ford .................. | G06Q 30/0277 705/71 |
| 2017/0316626 A1* | 11/2017 | Smith ..................... | G06F 21/36 |
| 2019/0205865 A1* | 7/2019 | Jamkhedkar ....... | G06Q 20/3274 |
| 2023/0245460 A1* | 8/2023 | Barburescu .......... | G06Q 10/087 348/143 |

* cited by examiner

*Primary Examiner* — Jacob Lipman
(74) *Attorney, Agent, or Firm* — FISHERBROYLES, LLP; Roger L. Browdy; James E. Mrose

(57) ABSTRACT

The present invention provides a method for generating change/contested/personal based visual credentials authentication (proof), (proof), said method implemented by one or more processors operatively coupled to a non-transitory computer readable storage device, on which are stored modules of instruction code that when executed cause the one or more processors to perform:

Real time creating at least two image each image having at least partial) visual credentials/proof/code containing personal/specific information based on context data in real time and user profile data original data of third party;

Real time generating and streaming multimedia file including the at least two images which create visual effect; wherein the video is available for streaming for limited period time.

Presenting the video stream at user phone;

18 Claims, 7 Drawing Sheets

Figure 2:
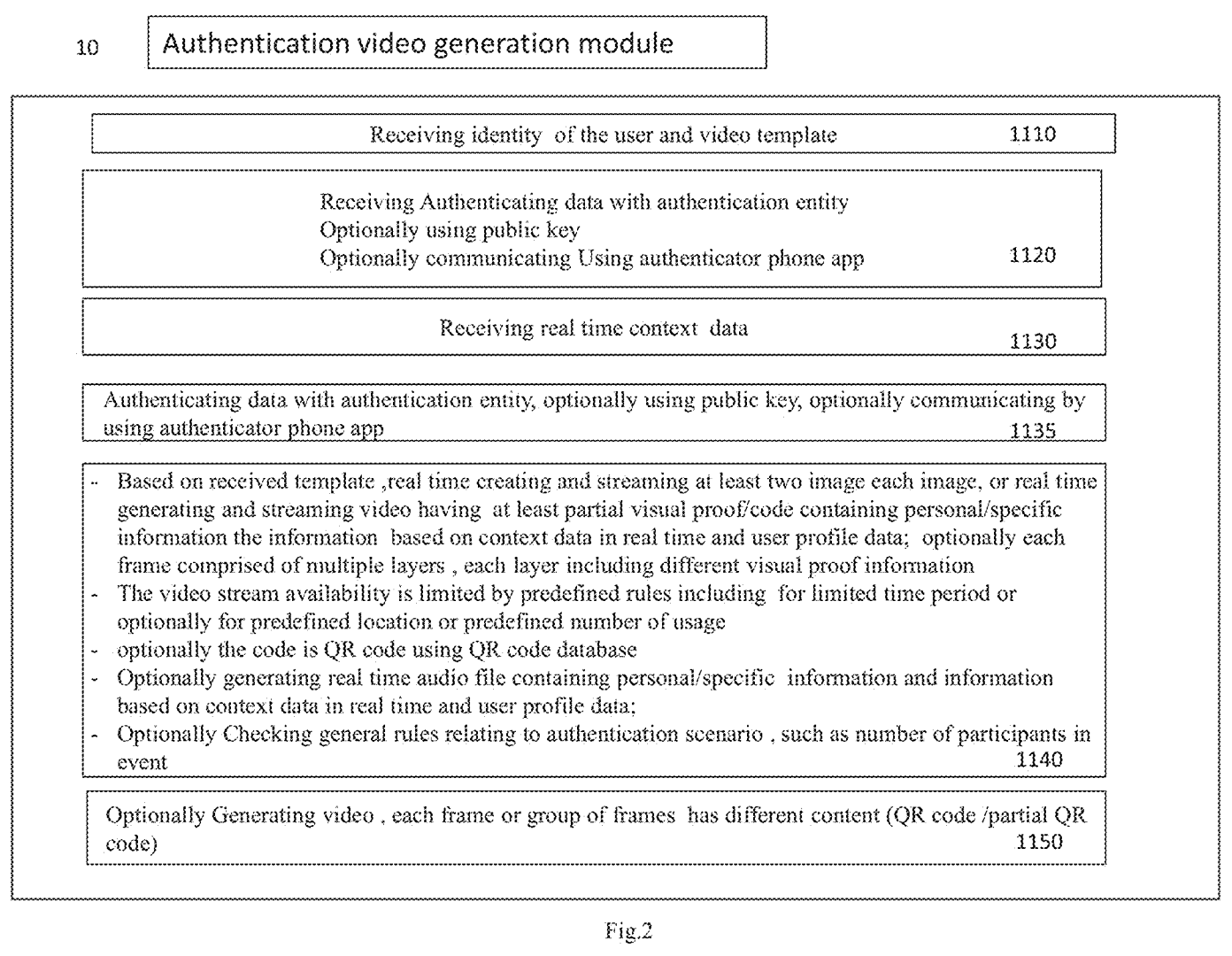

10

Authentication video generation module

| | |
|---|---|
| Receiving identity of the user and video template | 1110 |

Receiving Authenticating data with authentication entity
Optionally using public key
Optionally communicating Using authenticator phone app          1120

Receiving real time context data          1130

Authenticating data with authentication entity, optionally using public key, optionally communicating by using authenticator phone app          1135

- Based on received template ,real time creating and streaming at least two image each image, or real time generating and streaming video having at least partial visual proof/code containing personal/specific information the information based on context data in real time and user profile data; optionally each frame comprised of multiple layers , each layer including different visual proof information
- The video stream availability is limited by predefined rules including for limited time period or optionally for predefined location or predefined number of usage
- optionally the code is QR code using QR code database
- Optionally generating real time audio file containing personal/specific information and information based on context data in real time and user profile data;
- Optionally Checking general rules relating to authentication scenario , such as number of participants in event          1140

Optionally Generating video , each frame or group of frames has different content (QR code /partial QR code)          1150

Figure 3:
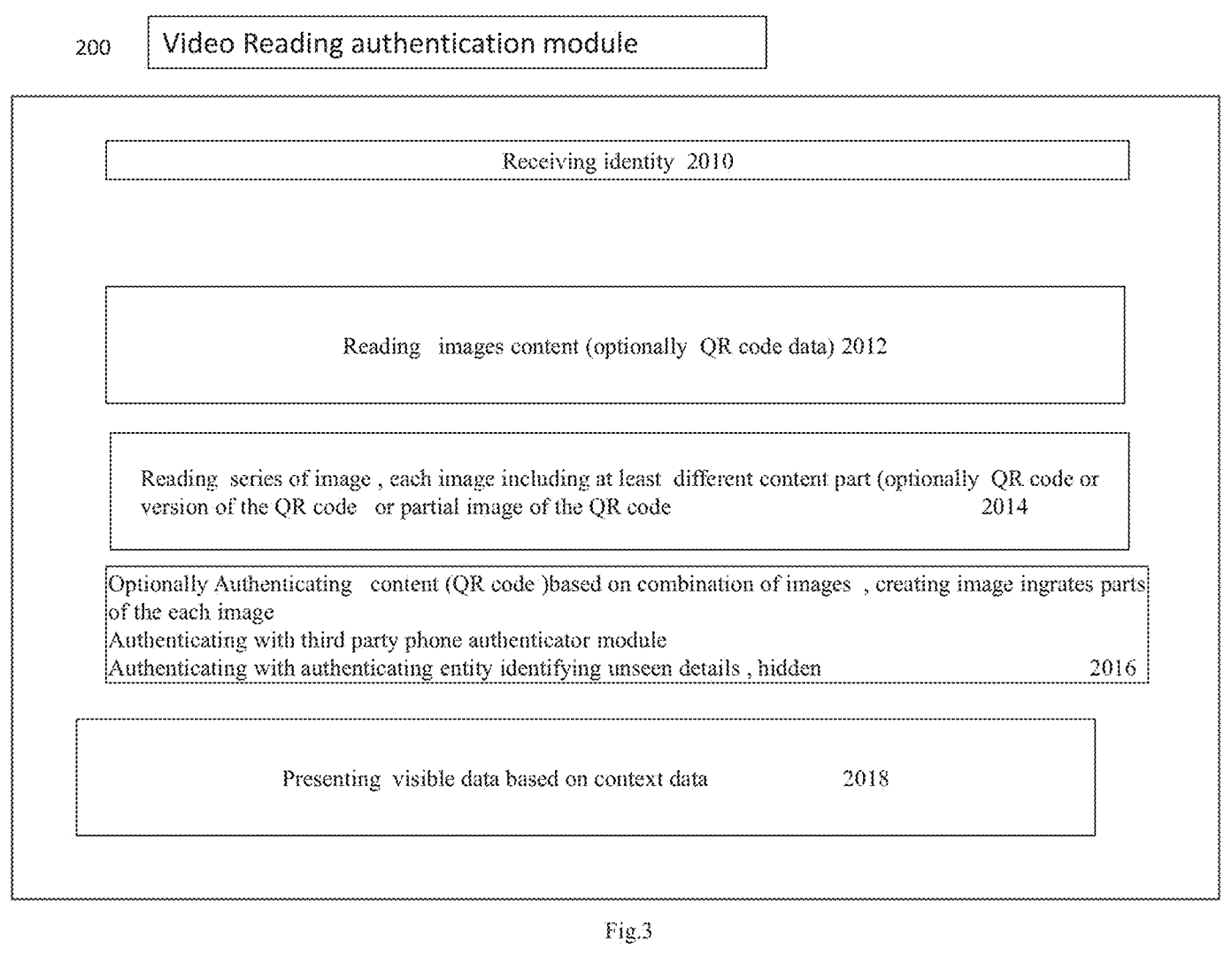

Video Reading authentication module

Receiving identity 2010

Reading images content (optionally QR code data) 2012

Reading series of image , each image including at least different content part (optionally QR code or version of the QR code or partial image of the QR code

2014

Optionally Authenticating content (QR code )based on combination of images , creating image ingrates parts of the each image
Authenticating with third party phone authenticator module
Authenticating with authenticating entity identifying unseen details , hidden

2016

Presenting visible data based on context data

Figure 5:
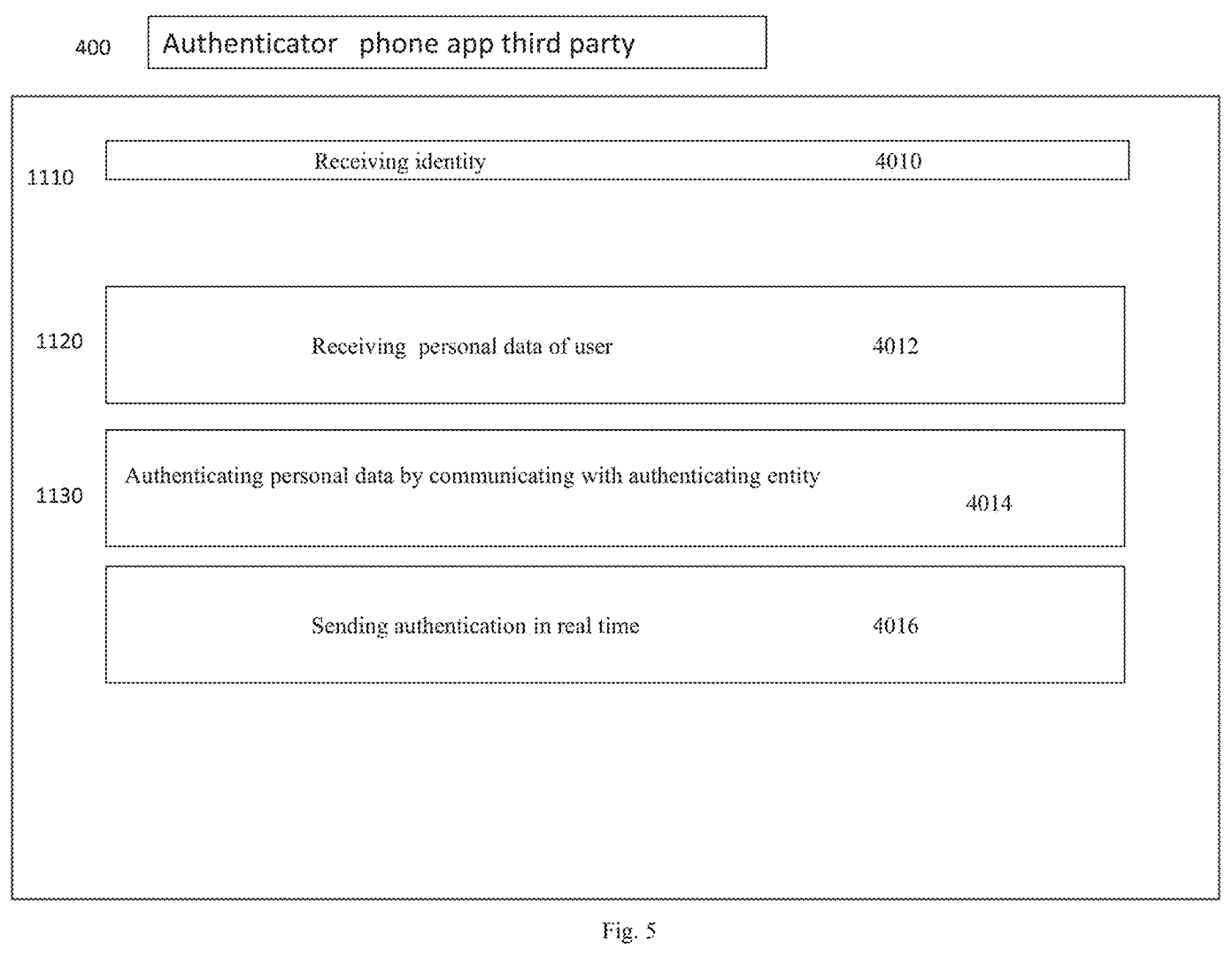

Authenticator phone app third party

1110 | Receiving identity | 4010

1120 | Receiving personal data of user | 4012

1130 | Authenticating personal data by communicating with authenticating entity | 4014

Sending authentication in real time | 4016

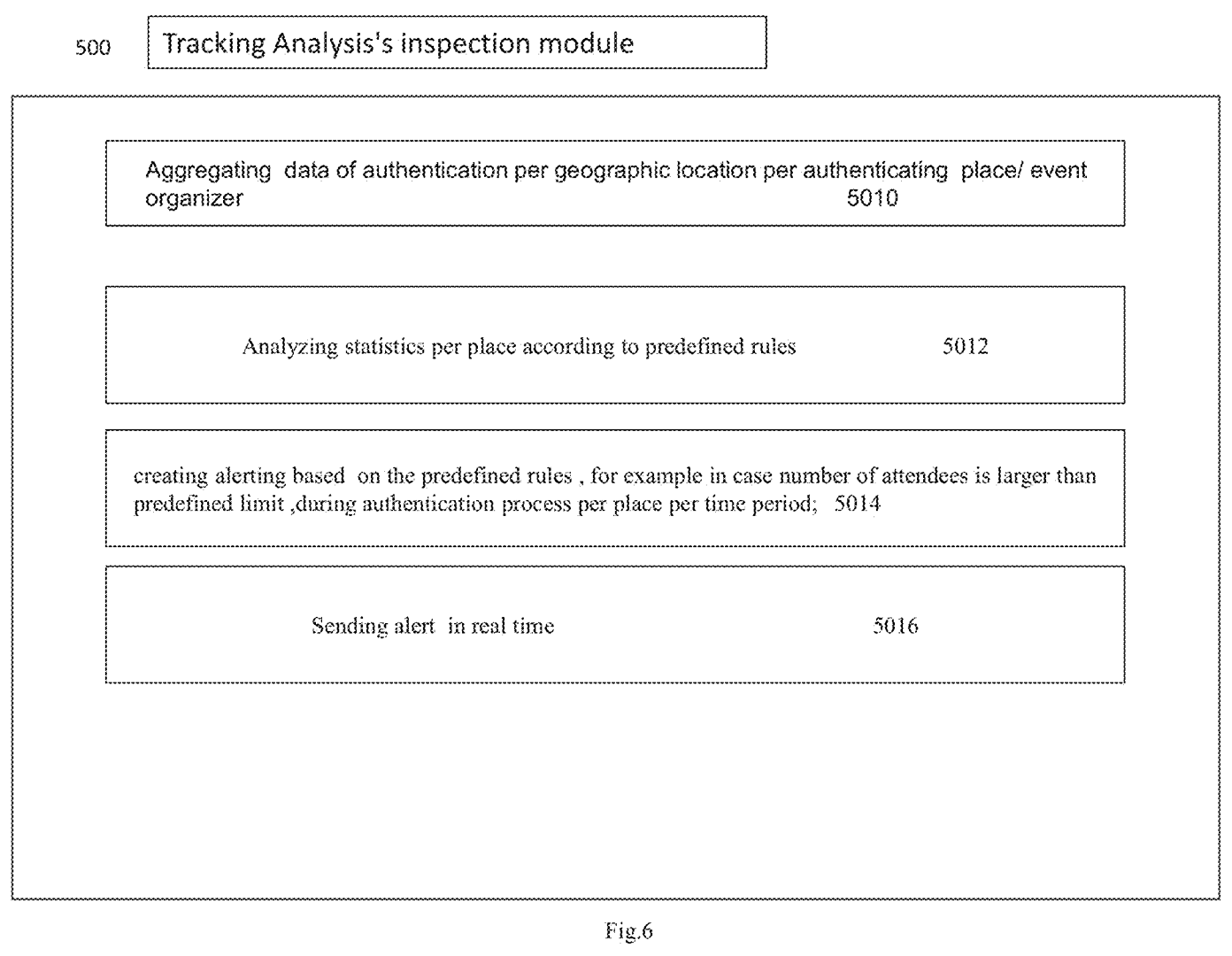

Tracking Analysis's inspection module

Aggregating data of authentication per geographic location per authenticating place/ event organizer
5010

Analyzing statistics per place according to predefined rules
5012 creating alerting based on the predefined rules , for example in case number of attendees is larger than predefined limit ,during authentication process per place per time period; 5014

Sending alert in real time
5016

Fig.6

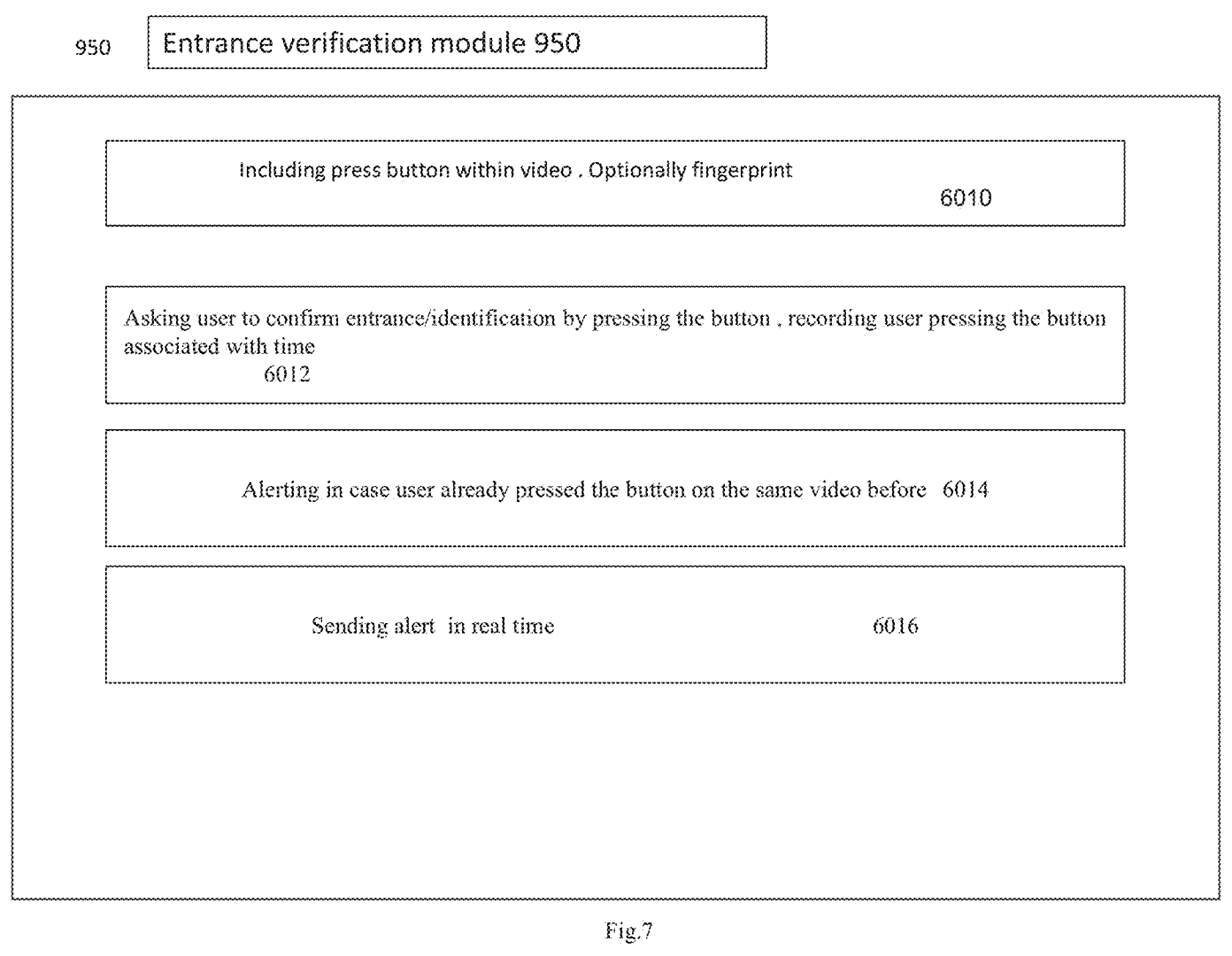

Entrance verification module 950

950

Including press button within video . Optionally fingerprint
6010

Asking user to confirm entrance/identification by pressing the button , recording user pressing the button associated with time
6012

Alerting in case user already pressed the button on the same video before 6014

Sending alert in real time
6016

Fig.7

SYSTEM AND METHOD FOR GENERATING VIDEO VISUAL PROOF

BACKGROUND

Technical Field

The present invention relates generally to generation of authentication using video.

SUMMARY

The present invention provides a method for generating change/contested/personal based visual credentials authentication (proof), said method implemented by one or more processors operatively coupled to a non-transitory computer readable storage device, on which are stored modules of instruction code that when executed cause the one or more processors to perform:

Real time creating at least two image each image having at least partial) visual credentials/proof/code containing personal/specific information based on context data in real time and user profile data original data of third party;

Real time generating and streaming multimedia file including the at least two images which create visual effect; wherein the video is available for streaming for limited period time.

Presenting the video stream at user phone;

wherein the video stream availability is limited by predefined rules including for limited time period or optionally for predefined location or predefined number of usages According to some embodiments of the present invention the method further comprising the step of authenticating with third party the generation of the video a. According to some embodiments of the present invention code based on integration of the at least two images;

b. According to some embodiments of the present invention tin the Generating video, each frame or group of frames is different QR code/partial QR code c. According to some embodiments of the present invention the image includes non-coded data of real time context data d. According to some embodiments of the present invention the Video multiple frames with background integrated non coded data of real time context data e. According to some embodiments of the present invention the method further generating audio file including proof of authentication;

f. According to some embodiments of the present invention the visual proof is seen only when playing the movie, no seen a single image g. According to some embodiments of the present invention the visual effect includes a motion effect h. According to some embodiments of the present invention enabling to read code based on integration of the at least two images.

i. The present invention provides A method for generating change/contested/personal based visual credentials authentication (proof), said method implemented by one or more processors operatively coupled to a non-transitory computer readable storage device, on which are stored modules of instruction code that when executed cause the one or more processors to perform:

Real time creating at least two image each image having at least partial) visual credentials/proof/code containing personal/specific information based on context data in real time and user profile data original data of third party;

generating downloadable multimedia file for a limited time period including the at least two images which create visual effect;

downloading and presenting the video stream at user phone, with limited time period;

The present invention discloses a method for generating visual personal authentication proof for third party entity, said method implemented by one or more processors operatively coupled to a non-transitory computer readable storage device, on which are stored modules of instruction code that when executed cause the one or more processors to perform:

real time creating at least two image each image having at least partial visual credentials containing personal specific information based on context data in real time, user profile data and original data of the third party;

real time generating and streaming multimedia file including the at least two images which create visual effect.

a. According to some embodiments of the present invention the method further comprising the step of authenticating with third party the generation of the video.

b. According to some embodiments of the present invention the method further enabling to read code based on integration of the at least two images.

c. According to some embodiments of the present invention each frame comprised of multiple layers, each layer including different visual proof information.

d. According to some embodiments of the present invention the video stream availability is limited by predefined rules including at least one of limited time period, predefined location or predefined number of usages.

e. According to some embodiments of the present invention the credential is a QR code.

f. According to some embodiments of the present invention further comprising the step of checking general rules relating to authentication scenario, wherein the rule include limitation to number of participants in event g. According to some embodiments of the present invention each frame or group of frames has different QR code/partial QR code wherein the image includes non—According to some embodiments of the present invention coded data of real time context data.

h. According to some embodiments of the present invention further generating audio file including proof of authentication.

i. According to some embodiments of the present invention the visual proof is seen only when playing the movie, not seen a single image.

j. According to some embodiments of the present invention the visual effect includes a motion effect.

The present invention discloses a system for generating visual personal authentication proof for third party entity, said system implemented by one or more processors operatively coupled to a non-transitory computer readable storage device, on which are stored modules of instruction code that when executed cause the one or more processors to perform:

authentication video generation module/server configured for:

a. real time creating at least two image each image having at least partial visual credentials containing personal specific information based on context data in real time and user profile data and original data of the third party;

b. real time generating and streaming multimedia file including the at least two images which create visual effect.

According to some embodiments of the present invention the systems further comprise module configured for authenticating with third party the generation of the video. According to some embodiments of the present invention each frame comprised of multiple layers, each layer including different visual proof information.

According to some embodiments of the present invention the video stream availability is limited by predefined rules including at least one of: limited time period, predefined location or predefined number of usages.

According to some embodiments of the present invention the credential is a QR code According to some embodiments of the present invention the authentication module further comprising the step of checking general rules relating to authentication scenario, wherein the rule include limitation to number of participants in event.

According to some embodiments of the present invention, each frame or group of frames has different QR code/partial QR code.

According to some embodiments of the present invention the image includes non-coded data of real time context data.

According to some embodiments of the present invention the visual proof is seen only when playing the movie, not seen a single image.

a. According to some embodiments of the present invention the visual effect includes a motion effect.

BRIEF DESCRIPTION OF THE SCHEMATICS

The present invention will be more readily understood from the detailed description of embodiments thereof made in conjunction with the accompanying drawings of which:

FIG. 2 is a block diagram depicting the Authentication video generation module, according to one embodiment of the invention.

FIG. 3 is a flowchart depicting the Video Reading authentication module according to some embodiments of the invention.

FIG. 5 is a flowchart depicting the Authenticator phone app third party according to some embodiments of the invention.

FIG. 6 is a flowchart depicting Tracking Analysis's inspection module according to some embodiments of the invention.

FIG. 7 is a flowchart depicting Entrance verification module according to some embodiments of the invention.

DETAILED DESCRIPTION OF THE VARIOUS MODULES

Figure 1:
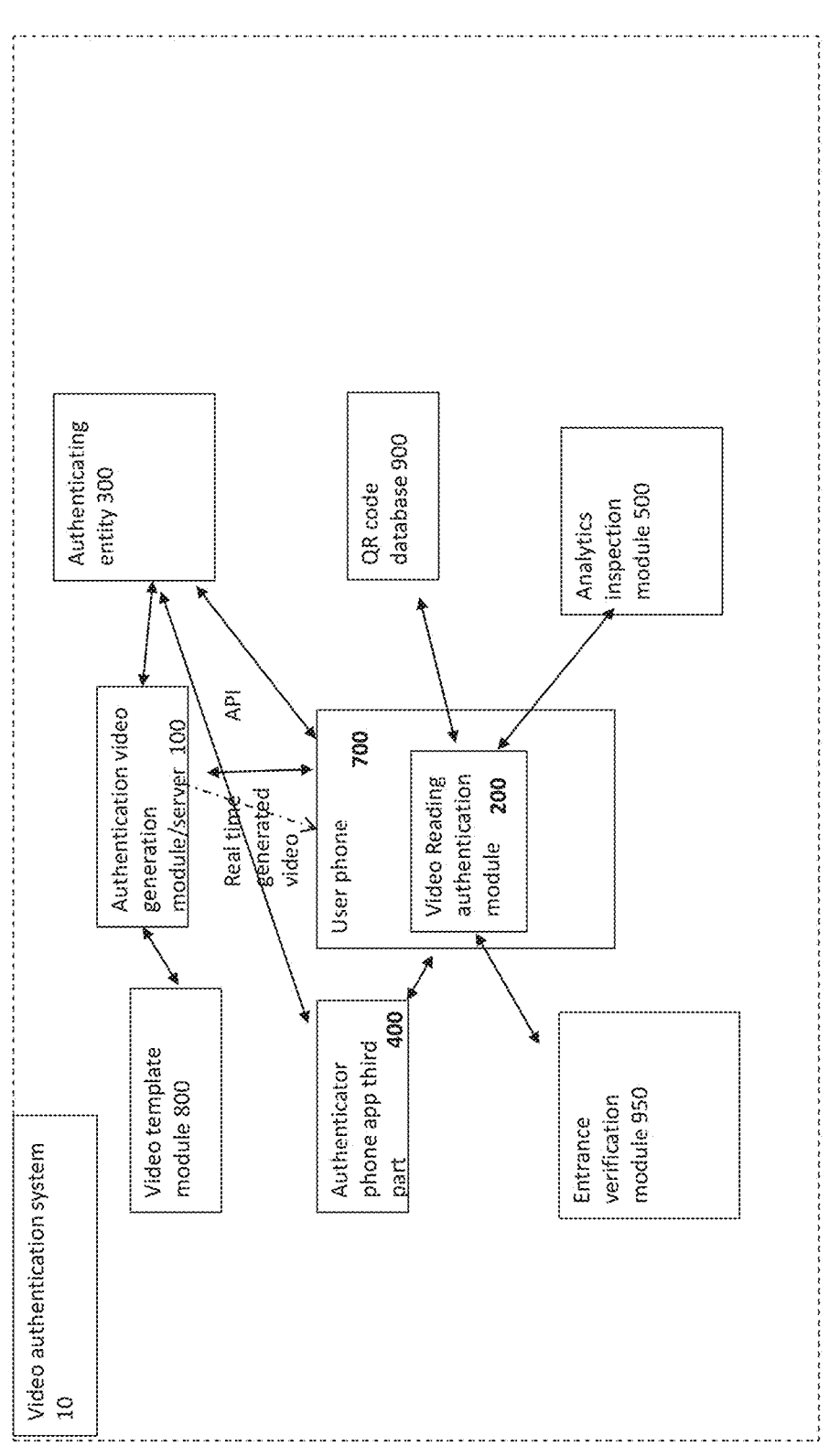
FIG. 1 is a block diagram, depicting the components and the environment of the video authentication system, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Definition a. Video instruction metadata contains data that are essential for drawing blueprints for the scene: including at least one of the following:

b. A composition of what elements to draw and where/when/how they should be drawn, transformed, animated, etc.).

c. The metadata may include text, images, and video, how they all move and appear throughout time together and with respect to each other.

d. The metadata include data of the 'scene graph' of the scene (i.e., how the scene is to be drawn from all of its elements, and throughout time).

FIG. 1 is a block diagram, depicting the components and the environment of the video authentication system, according to some embodiments of the invention.

The video authentication system is comprised of authentication video generation module 100 associated with an authentication entity 300 (official organization, governmental entity) and Video Reading authentication module 200 at the user smart phone 700. Optionally third-party phone having authenticating app 400 of an authorized personal is updated and provide authentication during the creation process of the video or while authenticating the video. The Authentication video generation module 100 may receive video template module from video template module 800. The video template is adapted to different scenarios of authentication, such as tickets and/or authorization permission for events, authentication health certificate. The video template includes code, instruction and or metadata for generating video based on personal data and/or context data the video at least two images or real time generating and streaming video, each frame or group of frames having different content (QR code/partial QR code, each image having at least partial visual proof/code containing personal/specific information and information based on context data in real time and user profile data. The instruction/code metadata are adapted for type of event, type of authentication data (coded or non-coded data, identity authentication or health certificate authentication). The template is configured to enable the user to customize/personalize to specific event or design.

According to some embodiments of the present invention the system further comprising analytics inspection module 500 configured to track event participant data and enforce predefined rules.

According to some embodiments of the present invention the system further comprising entrance verification module 950, configure to authenticate user entrance to an event.

FIG. 2 is a block diagram depicting the Authentication video generation module according to one embodiment of the invention.

The Authentication video generation module apply one of the following steps:

Receiving identity of a user and video templates (1110);

Receiving Authenticating data with authentication entity, optionally using public key or optionally communicating using authenticator phone app; (1120);

Receiving real time context data, such location, time, weather; (1130)

Authenticating data with authentication entity, optionally using public key, optionally communicating by using authenticator phone app; (1135)

Based on received video template, creating and streaming at real time at least two images or real time generating and streaming video, each image/frame or group of frames/images having different content (QR code/partial QR code), each image having at least partial visual proof/code containing personal/specific information and information based on context data in real time and user profile data; optionally each frame comprised of multiple layers, each layer including different visual proof information (1140);

The video stream availability may be limited by predefined rules including for limited time period or optionally for predefined location or predefined number of usages;

optionally the code is QR code using QR code database 900;

optionally generating real time audio file containing personal/specific information and information based on context data in real time and user profile data;

Optionally Checking general rules relating to authentication scenario, such as number of participants in event;

Optionally generating video, each frame or group of frames has different content (QR code/partial QR code); (1150)

FIG. 3 is a flowchart depicting the Video Reading authentication module according to some embodiments of the invention.

The Video Reading authentication module apply one of the following steps:

Reading images content (optionally QR code data); (2010)

Reading series of image, each image including at least one different content part such as user personal data (optionally QR code or version of the QR code or partial image of the QR code (2012);

Optionally Authenticating content (QR code) based on combination of images, creating image, integrating parts of each image; (2014)

Optionally authenticating with third part authenticator phone; (2016)

Figure 4:
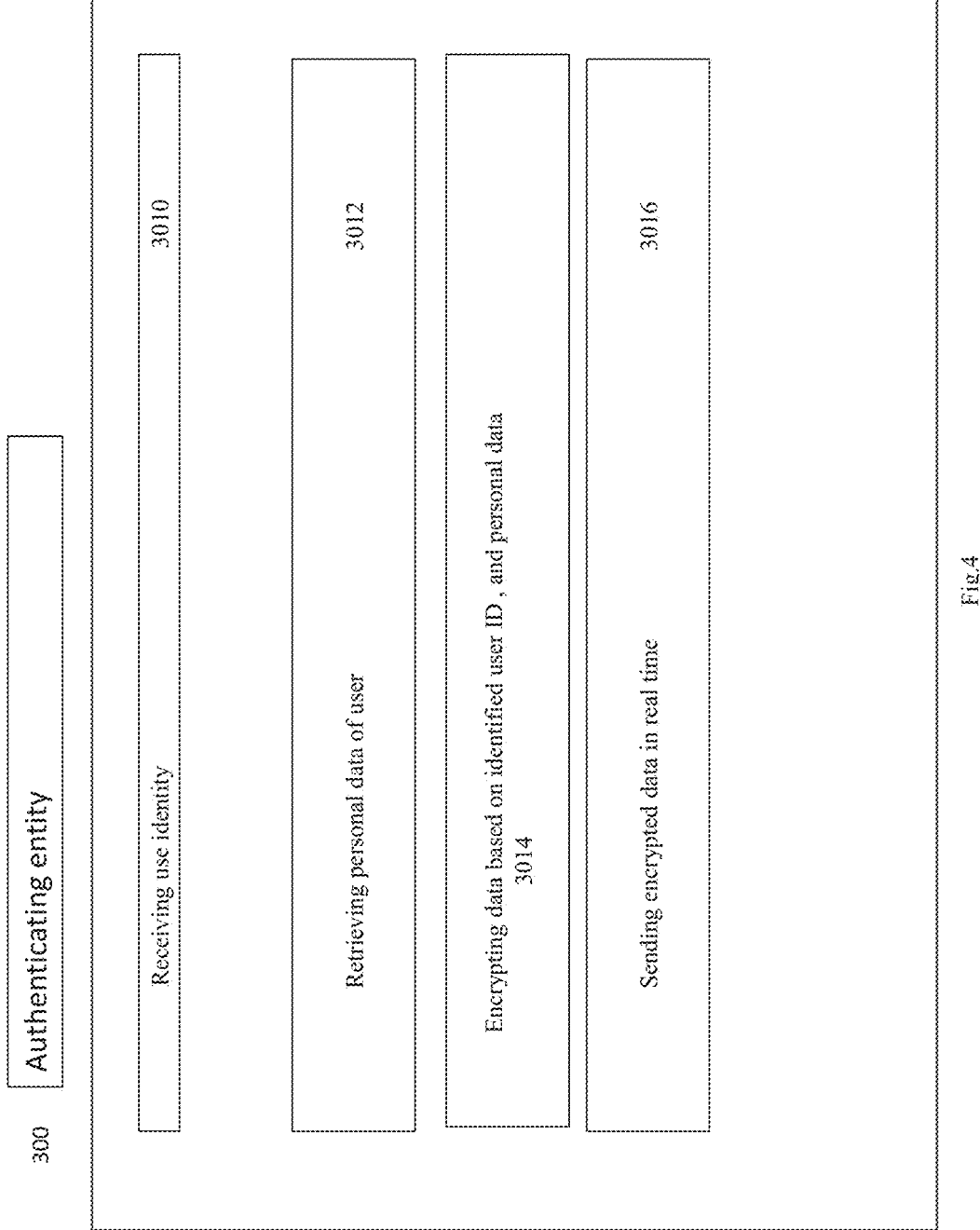
FIG. 4 is a flowchart depicting the authenticating entity module according to some embodiments of the invention.

Real time streaming Presenting visible data based on context data, visual effect (2018);

FIG. 4 is a flowchart depicting the authenticating entity module according to some embodiments of the invention.

The authenticating entity module apply at least one of the following steps

Receiving user identity (3010);

Retrieving personal data of user (3012);

Encrypting user based on identified user ID, and personal data (3014);

Sending data in real time (3016);

FIG. 5 is a flowchart depicting the Authenticator phone app third party according to some embodiments of the invention.

The Authenticator phone app third party apply at least one of the following steps:

Receiving identity (4010);

Retrieving personal data of user (4012);

Authenticating personal data by communicating with authenticating entity (4014);

Sending data in real time (4016);

FIG. 6 is a flowchart depicting Tracking Analysis's inspection module according to some embodiments of the invention.

The Tracking Analysis's inspection module apply at least one of the following steps:

Aggregating data of authentication per geographic location per authenticating place/event organizer; (5010)

Analyzing statistics per place according to predefined rules, such a number attendees, profile of attendees; (5012)

creating an alert based on the predefined rules, for example in case number of attendees is larger than predefined limit, during authentication process per place per time period; (5014)

Sending alert in real time; (5016)

FIG. 7 is a flowchart depicting Entrance verification module according to some embodiments of the invention.

The Entrance verification module apply at least one of the following steps:

Including press button within video. Optionally the button including finger print identification (6010);

Asking user to confirm entrance/identification (6012);

Alerting in case user already pressed the button on the video more than one time (6014);

Sending alert in real time (5016);

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g., digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client's for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for generating visual personal authentication proof for third party entity, said method implemented by one or more processors operatively coupled to a non-transitory computer readable storage device, on which are stored modules of instruction code that when executed cause the one or more processors to perform:

real time creating at least two images each image having at least: partial visual credentials containing personal specific information based on context data in real time, user profile data, and original data of a third party;

real time generating and streaming multimedia file including the at least two images which create visual effect;

wherein multimedia file stream availability is limited by predefined rules including at least one of: limited time period and predefined location;

wherein the multimedia file includes a press button within a video, enabling a user to confirm entrance, wherein in case the user already pressed the button on the video more than one time an alert is sent in real time.

2. The method of claim 1 further comprising the step of authenticating with third party the generation of the multimedia file.

3. The method of claim 1 further enabling to read code based on integration of the at least two images.

4. The method of claim 1 wherein each frame of the video is comprised of multiple layers, each layer including different visual proof information.

5. The method of claim 1 wherein the credential is a QR code.

6. The method of claim 1 further comprising the step of checking general rules relating to authentication scenario, wherein the rules include a limitation to a number of participants in an event.

7. The method of claim 1 wherein in the generating of the multimedia file, each image or group of images has a different QR code or a partial QR code.

8. The method of claim 1 wherein the image includes non-coded data of real time context data.

9. The method of claim 1 further generating audio file including proof of authentication.

10. The method of claim 1, wherein visual proof is seen only when playing the multimedia file, not seen a single image.

11. The method of claim 1 wherein the visual personal authentication proof includes a motion effect.

12. A system for generating visual personal authentication proof for third party entity, said system implemented by one or more processors operatively coupled to a non-transitory computer readable storage device, on which are stored modules of instruction code that when executed cause the one or more processors to perform:

authentication video generation module/server configured for:

real time creating at least two images each image having at least: partial visual credentials containing personal specific information based on context data in real time and user profile data, and original data of a third party;

real time generating and streaming multimedia file including the at least two images which create visual effect;

wherein multimedia file stream availability is limited by predefined rules including at least one of: limited time period and predefined location;

wherein the multimedia file includes a press button within a video, enabling a user to confirm entrance, wherein in case the user already pressed the button on the video more than one time an alert is sent in real time.

13. The system of claim 12 wherein the credential is a QR code.

14. The system, of claim 12 the authentication module further comprising the step of checking general rules relating to authentication scenario, wherein the rules include a limitation to a number of participants in an event.

15. The system of claim 12 wherein in the generating of the multimedia file, each image or group of images has a different QR code or a partial QR code.

16. The system of claim 12 wherein the image includes non-coded data of real time context data.

17. The system of claim 12 the further a module configured for authenticating with third party the generation of the multimedia file.

18. The system of claim 17 wherein each image is comprised of multiple layers, each layer including different visual proof information.

* * * * *